Patented Oct. 21, 1930

1,778,914

UNITED STATES PATENT OFFICE

WALTER M. RALPH, OF BUFFALO, NEW YORK, ASSIGNOR TO NATIONAL ANILINE & CHEMICAL CO., INC., OF NEW YORK, N. Y., A CORPORATION OF NEW YORK

PRODUCTION OF ACETYL-CLEVE'S ACID

No Drawing. Original application filed November 29, 1920, Serial No. 427,116. Divided and this application filed July 9, 1925. Serial No. 42,585.

This invention relates to improvements in the manufacture of 1-acetnaphthalid-6(or 7)-monosulfonic or acetyl-Cleve's acid, hereinafter referred to by the latter name.

According to the present invention, Cleve's acid, that is, 1-naphthylamine-6-monosulfonic acid and 1-naphthylamine-7-monosulfonic acid, either separately or in admixture, is heated in the form of the free acid with glacial acetic acid and sodium acetate whereby the monoacetyl derivative, that is, acetyl-Cleve's acid, is produced.

The invention will be further illustrated by the following specific example, but it will be understood that it is not limited thereto. The parts are by weight.

Example: 530 parts of glacial acetic acid are charged into a jacketed silicon iron (duriron) kettle provided with an agitator and reflux condenser. 136 parts of crystallized sodium acetate or 82 parts (one mol) of substantially anhydrous sodium acetate are then added, and finally 223 parts (one mol) of dry Cleve's acid (based on 100 per cent purity). The kettle is then closed, and the contents brought to a boil and allowed to reflux, with agitation, for about 24 hours. At the end of this time, the excess of acetic acid and the water present are distilled off. The agitation is continued throughout the distillation and the distillation is carried to such a point that a sample removed from the kettle hardens within about five minutes to such an extent that it may be broken by a sharp blow. The charge in the kettle is then removed, for example through a bottom discharge opening, into a suitable receptacle, where it is permitted to cool and harden. The dry product is comprised chiefly of the sodium salt of acetyl-Cleve's acid, and is substantially free from the salts of inorganic acids and from water.

When the process is thus carried out, the product will contain only a very small amount of unacetylated material, for example, one or two percent or less. Further, the solid product being substantially free from salts of inorganic acids and practically free from water is particularly suitable for use in many reactions, for example, such as subsequent solution in concentrated sulfuric acid followed by nitration for the production of nitro-acetyl-Cleve's acid as described in the parent application of which this application is a division. It may be pointed out that besides the alkali metal acetates, e. g., sodium acetate, acetates of other metals may be used, for example, the alkaline earth metal acetates, such as calcium acetate, etc.

The use of the dry free Cleve's acid has the important advantage, as compared with the use of the dry sodium salts of Cleve's acid, particularly from the manufacturing viewpoint, that the dry free acid is easily obtainable without the difficulties involved in preparing the dry sodium salts, but the free acid can nevertheless be effectively acetylated in the manner above described. The free Cleve's acid is not attacked, or is attacked but little, by glacial acetic acid alone, but when sodium acetate is also present, the free acid is apparently converted progressively into the form of its sodium salt which then reacts with the glacial acetic acid to give the acetyl compound. The reaction of the free acid with sodium acetate appears to be an equilibrium reaction, such that only a small amount of the sodium salt is formed and present at any one time, but the reaction of this salt with the acetic acid destroys the equilibrium and the reaction therefore proceeds to substantial completion in a gradual and progressive manner.

This method of acetylation of Cleve's acid is applicable to the acetylation of other aromatic amido-sulfonic acids.

This application is a division of my application filed November 29, 1920, Serial No. 427,116, which has matured into Patent No. 1,566,425.

I claim:

1. The method of producing monoacetyl-Cleve's acid which comprises inducing a reaction between Cleve's acid and glacial acetic acid in the presence of a salt of acetic acid.

2. The method of producing monoacetyl-Cleve's acid which comprises inducing a reaction between Cleve's acid and glacial acetic acid in the presence of an alkali metal acetate.

3. The method of producing monoacetyl-

Cleve's acid which comprises inducing a reaction between Cleve's acid and glacial acetic acid in the presence of sodium acetate.

4. The method of producing monoacetyl-Cleve's acid which comprises heating a mixture of Cleve's acid, glacial acetic acid and sodium acetate to the boiling temperature.

5. The method of producing monoacetyl-Cleve's acid which comprises heating a mixture of Cleve's acid, glacial acetic acid and sodium acetate to the boiling temperature and subsequently distilling off acetic acid and water from the mixture until a residue is obtained which upon cooling hardens to a brittle solid.

6. The method of producing monoacetyl-Cleve's acid which comprises heating a mixture of Cleve's acid, glacial acetic acid and sodium acetate to a refluxing temperature for about 24 hours and then subjecting the mass to distillation until a residue is obtained which hardens upon cooling to a solid.

7. In the production of monoacetyl-Cleve's acid, a method which comprises heating one mol of Cleve's acid with one mol of sodium acetate in the presence of an excess of glacial acetic acid.

8. In the production of monoacetyl-Cleve's acid, the process which comprises heating one mol of Cleve's acid in the free state with at least one mol of sodium acetate in the presence of more than one mol of glacial acetic acid at refluxing temperature, and distilling off acetic acid and water from the reaction mixture.

In testimony whereof I affix my signature.

WALTER M. RALPH.